Sept. 4, 1956 J. W. KEENAN 2,761,924
LIQUID LEVEL SENSING AND INDICATING DEVICE
Filed Dec. 1, 1954 3 Sheets-Sheet 1
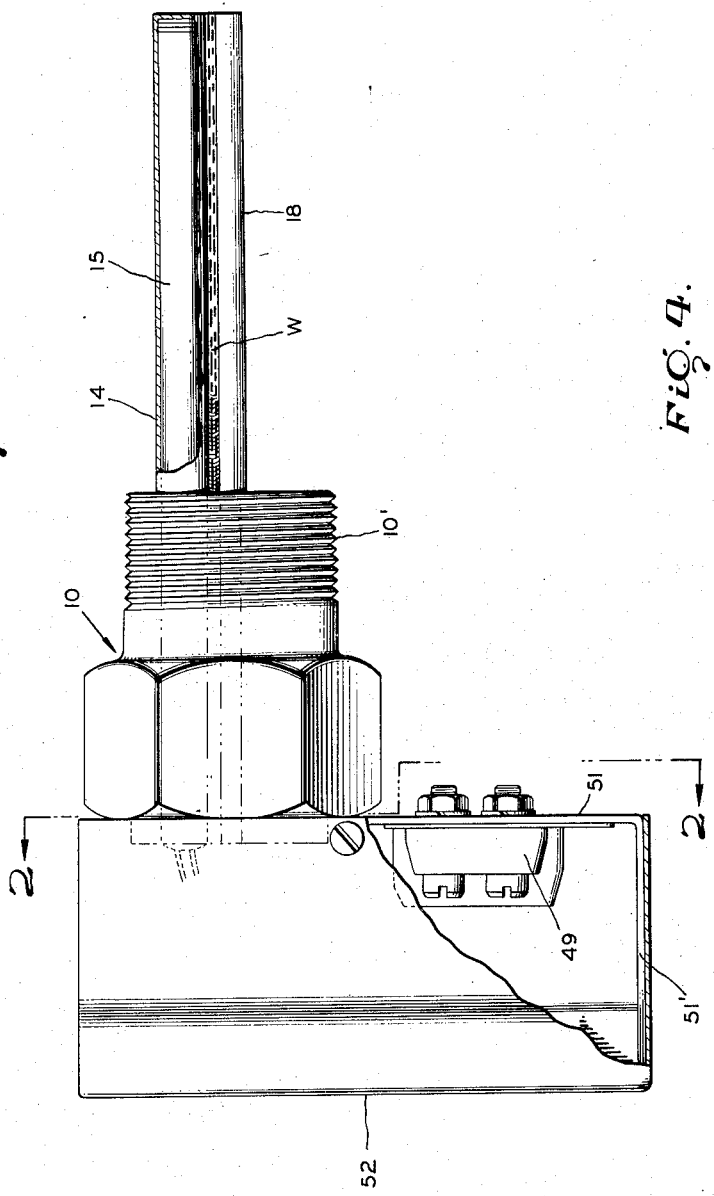
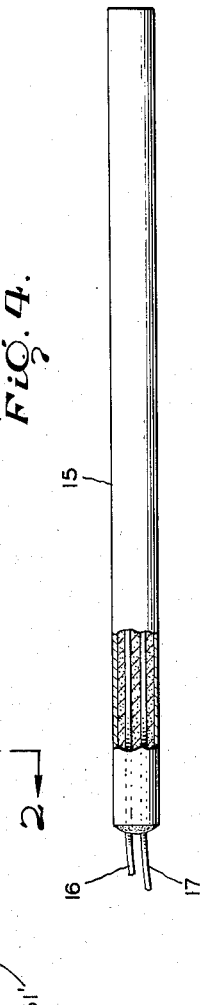
INVENTOR
James W. Keenan
BY
ATTORNEY INVENTOR
James W. Keenan.
BY K. G. Doub
ATTORNEY Sept. 4, 1956  J. W. KEENAN  2,761,924
LIQUID LEVEL SENSING AND INDICATING DEVICE
Filed Dec. 1, 1954  3 Sheets-Sheet 3
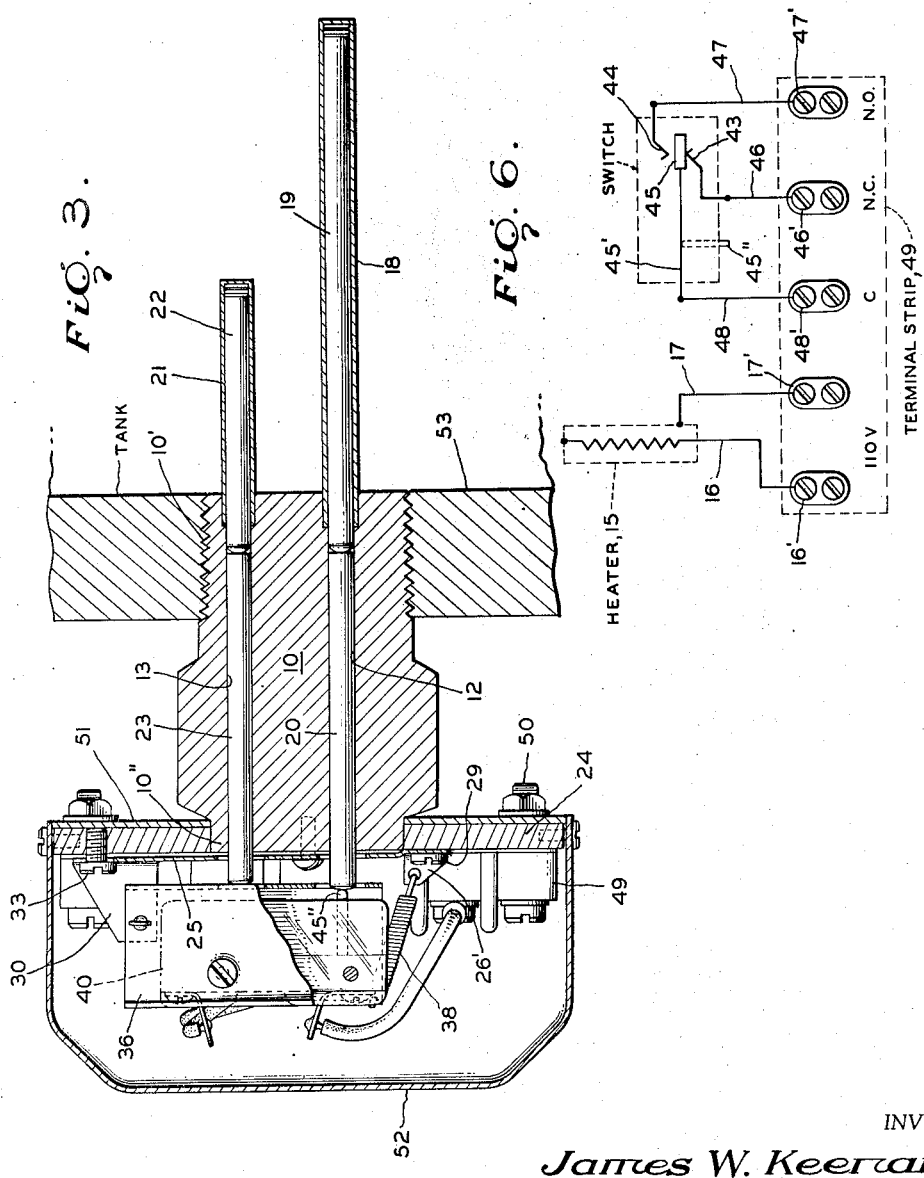
INVENTOR
James W. Keenan.
BY K G Doub
ATTORNEY United States Patent Office 2,761,924
Patented Sept. 4, 1956

2,761,924

LIQUID LEVEL SENSING AND INDICATING DEVICE

James W. Keenan, Baltimore, Md., assignor to Bendix Aviation Corporation, Baltimore, Md., a corporation of Delaware Application December 1, 1954, Serial No. 472,311

6 Claims. (Cl. 200—61.2)

Liquid level sensing and indicating devices of the heat dissipation type, incorporating means for compensating a switch-actuating thermal element for variations in temperature of the liquid or gas with which the indicator probe or probes are in contact, so as to cause the device to function in response to liquid level only, are known. Certain types of such devices, as heretofore constructed, incorporate the switch-actuating thermal elements, its heater and the compensating means in a single probe leg, while others provide a leg for the heater and thermal element and a separate leg for the compensating means. In either form, the device as a whole has been rendered more or less complicated by embodying switch mechanism and other working parts within the probe leg or legs. This not only exposes such parts to the temperature of the liquid in which the probes are immersed and/or the heater but it also increases the cost of manufacturing and assembly and complicates servicing during the life of the device.

An object of the present invention, therefore, is to provide a liquid level sensing and indicating device of the type specified wherein the probe assembly and the switch mechanism comprise separate units, the arrangement being such that the probe assembly may be manufactured and assembled and subsequently serviced separately from the switch mechanism, with the latter readily accessible for servicing without disturbing the probe assembly.

Another object is to provide a liquid level sensing and indicating device wherein the switch-actuating thermal element and the compensating element may be provided in cartridge form for ease in assembling and subsequent servicing, the said elements exerting thrust on slidable switch plungers in a straight line movement.

A further object is to provide a liquid level sensing and indicating device having a rugged probe assembly embodying a minimum number of moving parts.

The foregoing and other objects and advantages will become apparent in view of the following description taken in conjunction with the drawings, wherein:

Fig. 1 is a view in horizontal elevation, partly broken away, of a liquid level indicator in accordance with the invention;

Fig. 3 is a longitudinal section taken substantially on the line 3—3 of Fig. 2, with the switch mechanism shown partly in section and partly in elevation;

Fig. 4 is a detail view of a heater cartridge;

Fig. 6 is a wiring diagram of the heater and switch connections.

Figure 2:
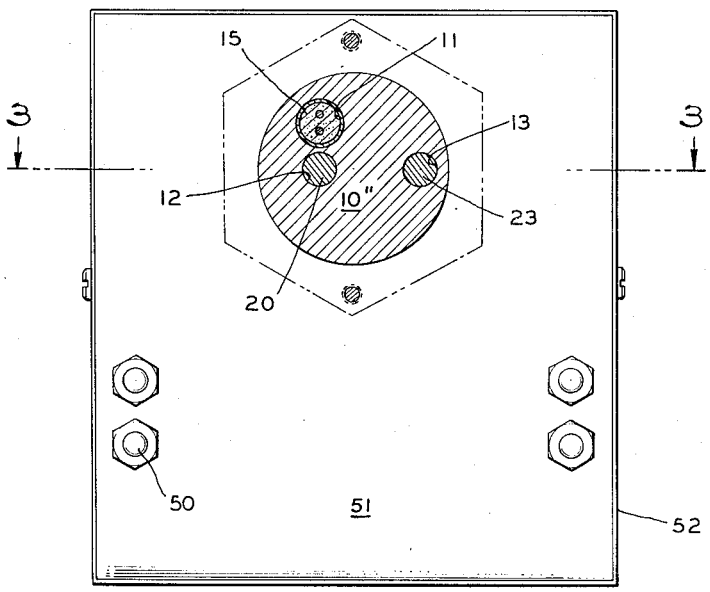
Fig. 2 is a view taken substantially on the line 2—2 of Fig. 1.

Referring to the drawings in detail, a mounting member or holder 10 provides the sole support for the entire device, said holder being in the form of a hex nut having a screw-threaded portion 10', adapted to be threaded into a mating socket formed in the wall of a tank or other container for the fluid whose level is to be maintained at a predetermined height. The holder 10 is provided with three through-bores 11, 12 and 13, the bore 11 functioning as a heater cartridge bore and the bores 12 and 13 serving as guide bores for switch plungers in a manner to be described. An elongated heater cartridge case 14 has the open end thereof partly telescoped into and secured as by welding to the contiguous extremity of the bore 11, the opposite end of said case being closed. In this manner the case 14 provides a smooth continuation of the bore 11. A heater element in the form of a cartridge 15, note particularly Fig. 4, is inserted in the bore 11 and at its outer end is provided with a pair of electrical connections or wires 16 and 17, adapted to be connected to a terminal block or panel 49 at 16' and 17', note Fig. 6.

The cartridge 15 may consist of a resistor coil embedded in suitable insulating material; it may be readily removed and replaced through the outer end of the holder 10 simply by removing a switch-supporting bracket in a manner to be described.

An elongated probe case 18 is partly telescoped into and secured to the inner end of the bore 12 in the same manner as the case 14. Within this bore is first inserted a thermal element in the form of an expansible rod 19, which in practice is comprised of extruded nylon but which may be made of any material having the desired coefficient of expansion in response to changes in temperature; and also received in the bore 12 in end-to-end contact with the element 19 is a plunger 20, having free sliding movement in the said bore. Preferably, the plunger 20 is made of material having the same coefficient of thermal expansion as the holder 10, to avoid binding. In practice, brass has proved satisfactory.

To insure effective heat transfer between the cartridge cases 14 and 18, the latter may be connected by weld material as indicated at "W" in Fig. 1.

The bore 13, as in the case of the bores 11 and 12, extends completely through the block 10 and at its inner end continues on into another probe case 21, which may be secured to the holder in a manner similar to the cases 14 and 18. The bore 13 is adapted to first receive a temperature-compensating element 22, followed by a plunger 23. The element 22 is in the form of a cartridge comprised of material having substantially the same coefficient of thermal expansion as the element 19. Likewise, the plunger 23 may be similar to the plunger 20 and has free sliding movement in the bore 13.

Figure 5:
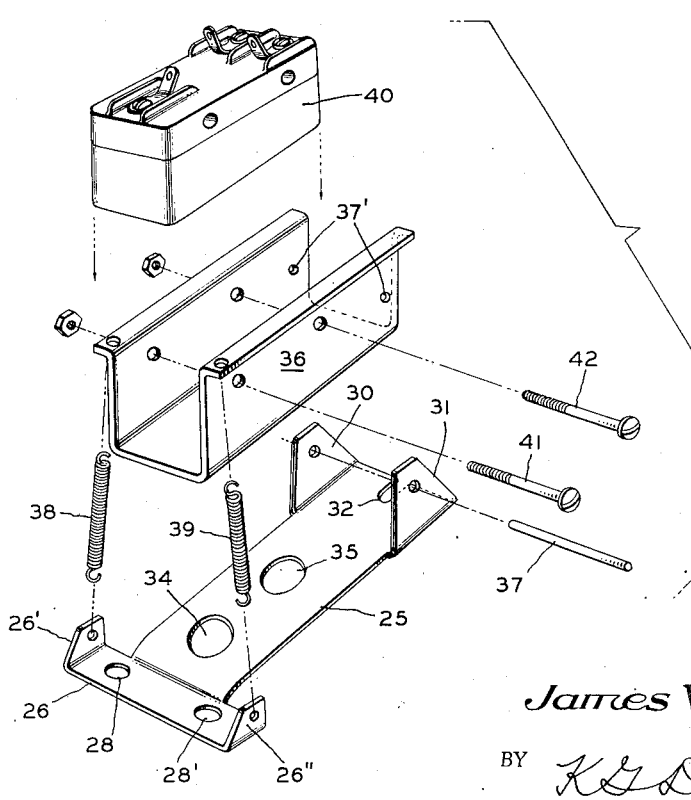
Fig. 5 is an exploded view of the component parts of the switch assembly.

To accommodate the switch mechanism and associated parts, a mounting plate 24 is provided and has a central opening which fits over a reduced outer end portion 10" of the holder 10, the outer end of the holder and consequently the bores 11, 12 and 13 being exposed through said central opening. A switch block cradle bracket 25, note Fig. 5, in the present instance in the form of a sheet metal stamping, is provided and at its one end is formed with a laterally extended portion 26, terminating in outwardly (upwardly as viewed in Fig. 5) projecting ears or lugs 26' and 26", for a purpose to be described, said portion 26 also having screw holes 28 and 28' therein to accommodate screws 29 (refer to Fig. 3), by means of which the said cradle bracket has its one end anchored to the plate 24; and at its opposite end the bracket 25 is formed with an additional pair of ears or lugs 30 and 31 and a central slot 32, the latter also being adapted to receive a fastening screw 33 for attaching this end of the cradle to said plate. At its centre, the bracket 25 is formed with a pair of holes 34 and 35, through which the adjacent ends of the plungers 20 and 23 have free sliding movement.

The holder bracket 25 is adapted to receive a switch block cradle 36, which at one end is pivotally supported from the ears or lugs 30, 31 by means of a pivot pin 37, the cradle 36 being formed with aligned holes 37' to accommodate said pivot pin. At its opposite end, the said cradle 36 is resiliently connected to the projecting lugs 26' and 26" by means of springs 38 and 39.

The cradle 36 is adapted to receive a switch member 40, the said member being transversely bored to accommodate small screw bolts 41 and 42, by means of which it is removably secured to the side walls of said cradle. The switch member 40 may be of any conventional type; in the present instance it consists of a hollow block of insulating material having therein a pair of stationary spring contacts 43 and 44, shown schematically in Fig. 6, and a movable contact 45, carried by a spring arm 45' abutted by the one end of a switch plunger 45", the latter being visible in Fig. 3. A pair of lead wires 46 and 47 are connected to the stationary contacts 43 and 44, and another lead wire 48 is connected to the movable contact 45, the said wires being brought out and connected to terminals 46', 47' and 48, carried by the terminal block 49, the latter being attached, as by screws 50, to a cover-supporting bracket 51, having outwardly-projecting flexible side walls 51', adapted to receive a cover 52.

To assemble the unit, it is only necessary to insert the cartridge 15 through the elongated hole or bore 11 into the case 14, and in a like manner assemble the temperature element 19 and compensating element 22 with associated plungers 20 and 23 into the bores 12 and 13. The cradle bracket 25 and cradle 36 together with the switch block 40, may be separately assembled as a unit and then connected to the plate 24. When so connected, the cradle bracket 25 is held rigid to the plate 24, with the cradle free to pivot on the pin 37, the springs 38 and 39 urging the cradle inwardly towards the holder 10. The wiring 16, 17 for the cartridge 15, together with the switch wires 46, 47 and 48 may then be suitably connected to the terminal block 49, and from this block suitable connections may be made to the supply line and also to a suitable signal or indicator, as conditions demand.

*Operation*

Assuming the device is to be used to indicate and/or control the level of liquid in a tank, one of the side walls of which is indicated at 53, then the holder 10 may be threaded into a suitable opening adapted to receive the same, with the probe cases 14, 18 and 21 carrying the sensing elements and the heating element projecting into the liquid. Electric current normally maintains the heating element 15 at a certain predetermined temperature, causing said element to in turn maintain the sensing element 19 at some predetermined temperature. As long as the level of the liquid is above that of the temperature element 19, heat will be dissipated from the latter at a relatively rapid rate, so as to maintain the temperature of the element at a value approximating that of the liquid. Under such conditions, the element 19 will be in its retracted or contracted position, and hence the spring-pressed switch plunger 45" is free to hold the movable switch contact 45 against the contact 43. In the arrangement shown in the wiring diagram of Fig. 6, this is the circuit-closing position of the switch, but it can be the open-circuit position, if desired, depending upon the type of circuit selected. Should the level of the liquid drop below the probe case 18, the liquid will no longer be able to dissipate the heat at a sufficiently rapid rate and hence the temperature of the element 19 will rise, causing the latter to expand and move the plunger 20 outwardly, to in turn cause the switch plunger 45" to move the contact 45 against the contact 44. In this position, a visual signal may be de-energized and a control circuit energized, to indicate that the level of the liquid has dropped below a safe value and/or initiate operation of mechanism functioning to bring the liquid back up to its predetermined level.

To compensate for variations in temperature of the liquid so as to prevent operation of the switch mechanism in response to changes in temperature of the liquid, the compensating element 22 is provided. Thus, should the temperature of the liquid vary, it will act to expand and contract the element 22 which in turn will act on the plunger 23, and the latter in turn will reposition the cradle 36 and the switch block 40 carried thereby so that a proportionate travel of the plunger 20 is necessary to operate the switch plunger.

A liquid level sensing and indicating device made in accordance with that disclosed herein, is reliable in operation and may be readily serviced whenever required throughout its active life. Furthermore, the probe elements 19, 22 and heater element 15, along with the switch plungers 20 and 23, may all be manufactured as separate items and quickly and easily assembled within the case or housing provided by the members 14, 18 and 21 and the holder 10. When it is desired to replace any of the elements, it is only necessary to remove the cradle 36, whereupon the end of the holder through which the parts are assembled is exposed. Likewise, the switch mechanism, being contained within the block 40, can be replaced simply by inserting a new unit whenever desired without disturbing the remaining parts of the device.

What is claimed and desired to be secured by United States Letters Patent is:

1. A liquid level probe device comprising a holder formed with a pair of guide bores contiguous to one another and another bore spaced from said first-named bores, hollow elongated cartridge cases connected to said holder and forming continuations of said bores, a heater element in cartridge form insertible through one of said pair of bores into its associated case and a switch-actuating thermal element insertible through the adjacent bore into its associated case, a compensating thermal element insertible in said third bore and into its associated case, a pair of plungers slidable in the bores which receive said thermal elements, said plungers being disposed in end-to-end relation with said thermal elements, and a switch unit located within operative adjacency to the outer ends of said plungers.

2. A liquid level probe device comprising a holder having a plurality of bores extending therethrough, hollow elongated cartridge cases secured to said holder in alignment with the said bores, a heater cartridge insertible through one of said bores into its associated case, a switch-actuating thermal element insertible through another of said bores into its associated case and a compensating thermal element insertible through another of said bores into its associated case, actuating plungers slidable in the bores which receive said thermal elements, said plungers being disposed in end-to-end relation with said thermal elements, switch mechanism mounted within operative adjacency to the outer ends of said plungers, one of said thermal elements acting through its associated plunger to operate said switch mechanism and the other of said elements acting through its associated plunger to bodily displace said switch mechanism in a direction to compensate for the effects of changes in temperature of the liquid on said first-named thermal element.

3. A liquid level probe device as claimed in claim 2, wherein the cases for said heater cartridge and said switch-actuating thermal element are joined along their contiguous longitudinal surfaces by material having good heat-conducting properties.

4. A liquid level probe device comprising a substantially solid holder provided with a pair of through-bores located adjacent one another and a third bore spaced from said pair of bores, hollow cartridge cases having open ends secured to said holder in alignment with said bores, an electric heater element in the form of a cartridge insertible in one of said pair of bores and into its associated case and a switch-actuating thermal element insertible in the adjacent bore to be subject to the temperature of said heater, a compensating thermal element insertible in said third bore, a pair of plungers slidable in the bores which receive said thermal elements, said plungers being disposed in end-to-end relation with said thermal elements, and switch mechanism located within operative adjacency to said plungers, said switch mechanism comprising a switch block adapted to house switch contacts and a cradle removably supporting said block, means resiliently urging said cradle and block toward said plungers, expansion of said first-named thermal element causing its associated plunger to actuate said switch mechanism and expansion of said compensating thermal element causing its associated plunger to displace said switch block bodily with respect to said first-named plunger.

5. A liquid level probe device comprising a holder provided with a pair of through-bores located adjacent one another and a third bore spaced from said pair of bores, an electric heater element insertible in one of said bores and projecting from the inner extremity of the bore, a switch-actuating thermal element insertible in the adjacent bore to be subject to the temperature of said heater element, a compensating thermal element insertible in said third bore, said switch-actuating thermal element and compensating thermal element projecting inwardly from said holder in the form of probes, a pair of plungers slidable in the bores which receive said thermal elements, said plungers being disposed in end-to-end relation to said thermal elements, and switch mechanism located within operative adjacency to said plungers.

6. A liquid level probe of the heat-dissipation type comprising a holder provided with a pair of through-bores, a switch-actuating thermal element projecting inwardly from said holder in the form of a probe and a compensating thermal element also projecting in a like manner from said holder, said elements being disposed in alignment with said bores, a pair of plungers disposed in said bores in end-to-end relation to said thermal elements, switch mechanism disposed within operative adjacency to said plungers, and means for subjecting said switch-actuating probe to a predetermined temperature.

References Cited in the file of this patent
UNITED STATES PATENTS

| | | |
|---|---|---|
| 1,942,241 | Duhme | Jan. 2, 1934 |
| 2,210,526 | Burling | Aug. 6, 1940 |
| 2,246,563 | Winters | June 24, 1941 |
| 2,640,129 | Starbird | May 26, 1953 |